(12) United States Patent
Anger

(10) Patent No.: US 6,588,894 B2
(45) Date of Patent: Jul. 8, 2003

(54) RIMLESS SPECTACLES

(75) Inventor: Wilhelm Anger, Salzburg (AT)

(73) Assignee: Eye-Systems GmbH, Chur (CH)

( * ) Notice: Subject to any disclaimer, the term of this patent is extended or adjusted under 35 U.S.C. 154(b) by 0 days.

(21) Appl. No.: 10/156,754

(22) Filed: May 24, 2002

(65) Prior Publication Data

US 2003/0076476 A1 Apr. 24, 2003

(30) Foreign Application Priority Data

Oct. 18, 2001 (DE) .......................... 101 51 463

(51) Int. Cl.$^7$ ................................. G02C 1/02
(52) U.S. Cl. ........................ 351/110; 351/140
(58) Field of Search ................. 351/110, 140, 351/141

(56) References Cited

U.S. PATENT DOCUMENTS 4,685,781 A * 8/1987 Wiedmann et al. ......... 351/110
6,170,950 B1 * 1/2001 Yoshida ...................... 351/110
6,485,141 B2 * 11/2002 Yoshida ...................... 351/110

FOREIGN PATENT DOCUMENTS

DE          19721306          11/1998

* cited by examiner

*Primary Examiner*—Huy Mai
(74) *Attorney, Agent, or Firm*—Ware, Freesola, Van Der Sluys & Adolphson LLP

(57) ABSTRACT

A spectacle lens (2) has a first through-hole (22) into which a stud (16) formed in an end piece. The first through-hole (22) and the stud (16) have corresponding non-circular cross-sectional profiles. In the stud and in a contact portion of the end piece, a second through-hole (18) is formed, with a pin (24) being inserted therein, the pin having a head (28) which, with its lower side, abuts on the spectacle lens (2) on the side thereof facing away from the contact portion (10).

14 Claims, 1 Drawing Sheet

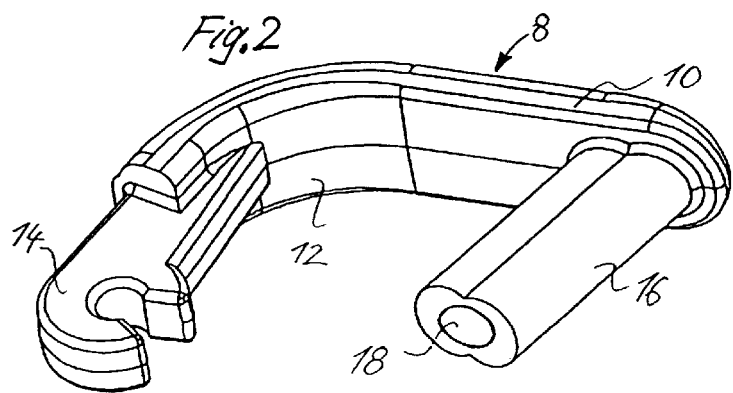
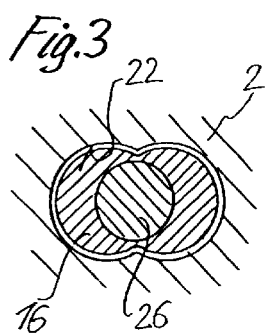
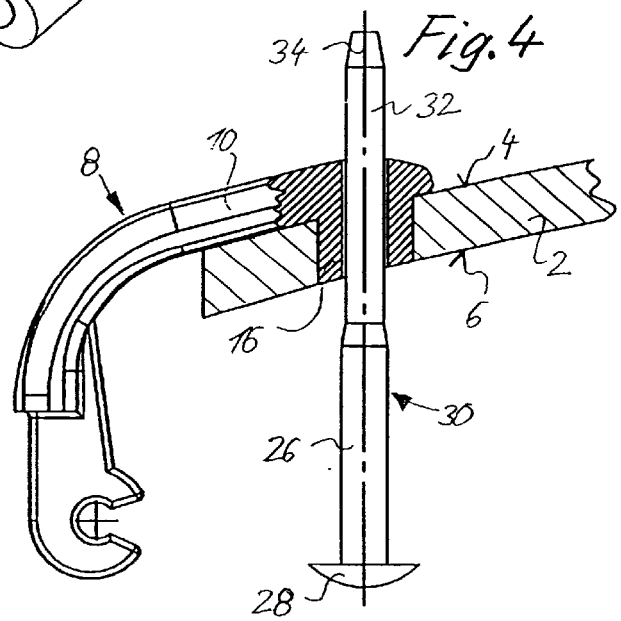
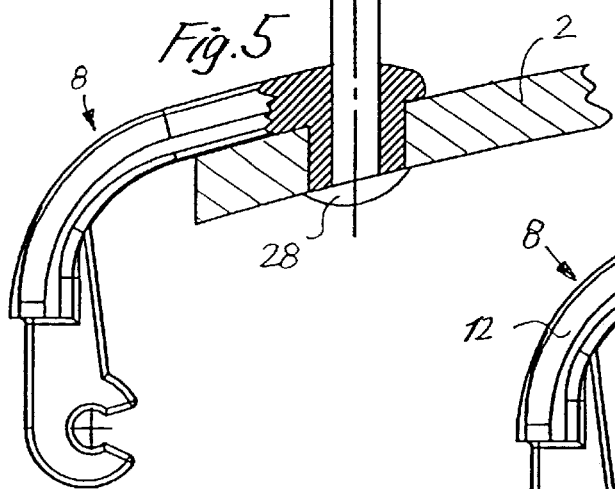
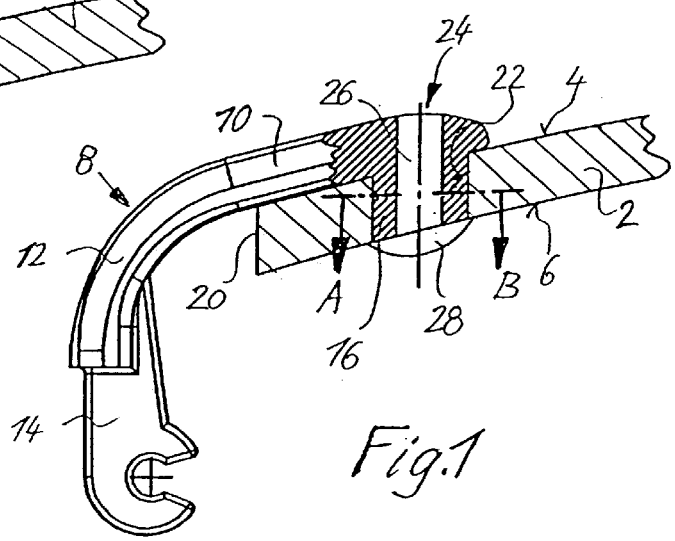

RIMLESS SPECTACLES

CROSS-REFERENCE TO RELATED APPLICATION

The present application discloses subject matter also disclosed and which may be claimed in co-owned, application Ser. No. 10/156,649, filed on May 24, 2002 entitled "Arrangement Comprising an Endpiece, a Temple Headpiece and a Hinge for Spectacles", now U.S. Pat. No. 6,540,351 issued Apr. 1, 2003.

BACKGROUND OF THE INVENTION

The invention relates to rimless spectacles.

Such spectacles are known. In these known spectacles, the first through-hole is a circular cylindrical hole and the stud is a circular cylindrical stud. The stud is fixed in the first through-hole by gluing using an adhesive. This kind of connection between bridge and endpieces, on the one hand, and spectacle lenses, on the other hand, has proved to be sufficiently reliable. However, problems may occur when the gluing is not carried out properly. Furthermore, it has been observed that when the spectacles are treated inappropriately, the stud at the transition to the contact portion cracks or is sheared off.

BRIEF SUMMARY OF THE INVENTION

The invention has the object of further developing the generic rimless spectacles in such a way that the above-mentioned problems are prevented. In particular, the spectacles to be provided shall be such that the connection between the respective spectacle lens and the bridge and/or the endpieces is always reliably firm and has a high mechanical strength even under a comparatively high strain.

According to the invention, rimless spectacles comprise two spectacle lenses, a bridge connected with both spectacle lenses, a first endpiece connected with the one of the spectacle lenses at a portion thereof facing away from the bridge, and a second endpiece connected with the other one of the spectacle lenses at a portion thereof facing away from the bridge, wherein, for connecting the bridge and/or the two endpieces with the respective spectacle lens, the latter has a first through-hole extending from the front side to the rear side thereof, and the bridge and/or each of the two endpieces has/have a contact portion abutting on the front side or the rear side of the spectacle lens as well as a stud integrally formed with the contact portion and being inserted into the first through-hole, characterized in that the first through-hole has a non-circular cross-sectional profile, that the stud has a non-circular cross-sectional profile conforming to the cross-sectional profile of the first through-hole, that in the stud and in the contact portion, a second through-hole is formed, and that a pin is inserted into the second through-hole, said pin having a head which, with its lower side, abuts on the spectacle lens on the side thereof facing away from the contact portion.

Further according to the invention, the contact portion and the stud comprise plastic material.

Further still according to the invention, each of the conforming non-circular cross-sectional profiles of the first through-hole and the stud is a profile defined by two partly overlapping circles.

Further still according to the invention, each of the conforming non-circular cross-sectional profiles of the first through-hole and the stud is a flat oval profile having straight long sides.

Further still according to the invention, a transition fit is provided between the first through-hole and the stud.

Further still according to the invention, a clearance fit is provided between the first through-hole and the stud.

Further still according to the invention, the free front surface of the stud runs flush with the side of the spectacle lens facing away from the contact portion.

Further still according to the invention, the pin is fixed in the second through-hole by a form-locking engagement.

Further still according to the invention, the pin has an external thread.

Further still according to the invention, the pin is fixed in the second through-hole by a force-locking engagement.

Further still according to the invention, the pin consists of plastic material.

Further still according to the invention, the upper side of the head of the pin is lenticular.

Further still according to the invention, the pin end facing away from the head of the pin runs flush with the surface of the contact portion facing away from the spectacle lens.

Further still according to the invention, the contact portion is arranged on the front side of the spectacle lens.

In the spectacles according to the invention, the bridge and/or the endpiece, on the one hand, and the spectacle lens, on the other hand, are firmly connected with each other without gluing being required for this purpose; thus, faulty gluing cannot have any impact on the strength of the connection. In the known spectacles, rotation prevention, i.e. the prevention of a relative rotation between bridge or endpiece and spectacle lens, is effected by the adhesive. In the spectacles according to the invention, the rotation prevention is achieved by a form-locking engagement between the stud and the first through-hole, namely in that both the first through-hole and the stud have a non-circular cross-sectional profile and these cross-sectional profiles are identical. The non-circular cross-sectional profile of the stud increases the stud's resistance against torsion and, thus, prevents a fracture or a shearing off of the stud at the transition to the contact portion. Moreover, an advantage of the spectacles according to the invention consists in that here the function of the rotation prevention and the function of the fastening, i.e. the fixing of the bridge or the endpiece at the spectacle lens in the axial direction of the stud, are separate from each other. The last-mentioned function is effected by the pin with its head and the first-mentioned function is effected by the stud with its non-circular cross-sectional profile in interaction with the non-circular first through-hole. Thus, the prevention of rotation is ensured no matter how firmly the spectacle lens is clamped between the contact portion and the head of the stud.

These and other objects, features and advantages of the present invention will become more apparent in light of the following detailed description of a best mode embodiment thereof, as illustrated in the accompanying drawing.

BRIEF DESCRIPTION OF THE DRAWINGS

In the following, a preferred embodiment of the invention will be explained in greater detail, making reference to the drawing. In the drawing:

FIG. 1 shows a top view, partly in section, of the left portion of an embodiment of the spectacles according to the invention;

FIG. 2 shows a perspective view of an endpiece of the spectacles according to FIG. 1;

FIG. 3 shows a sectional view according to A–B in FIG. 1 in a somewhat enlarged scale;

FIG. 4, in a view similar to FIG. 1, shows a state during the assembly of the spectacles according to FIG. 1; and FIG. 5, in a view similar to FIG. 1, shows a further state following the state according to FIG. 4 during the assembly of the spectacles according to FIG. 1.

DETAILED DESCRIPTION OF THE INVENTION

FIG. 1 shows a top view, partly in section, of the left portion of rimless spectacles according to an embodiment of the invention. The spectacles comprise a left spectacle lens 2 with a front side 4 and a rear side 6, as well as a first, left endpiece 8, which is connected to the portion of the spectacle lens 2 shown in FIG. 1.

In FIG. 2, the endpiece 8 is shown in a perspective view in the state in which it is prior to it being connected to the spectacle lens 2. The endpiece 8 is a component made in one piece from an injection-moldable plastic material and comprises a contact portion 10, which, in the embodiment shown in the figure, has the form of a flat strip, a portion 12 curved in the shape of an arc and situated next to the contact portion 10, and a hinge portion 14 situated next to the curved portion 12 and intended to be connected to a correspondingly formed hinge portion of a non-depicted temple of the spectacles.

A straight stud 16 extends from the rear side of the contact portion 10 shown in FIG. 2. The stud 16 has a non-circular cross-sectional profile which is defined by two partly overlapping circles, as can in particular be seen from the sectional view according to FIG. 3. In the stud 16, a through-hole 18 is formed, the through-hole extending in the axial direction of the stud 16 through the same and through the contact portion 10.

In the spectacle lens 2, a through-hole 22 is formed; it extends from the front side 4 to the rear side 6 and parallel to the edge 20 of the spectacle lens 2. As is shown in FIG. 3, the through-hole 22 has a non-circular cross-sectional profile which conforms to the non-circular cross-sectional profile of the stud 16 and which, in the embodiment shown in the figure, is, accordingly, also defined by two partly overlapping circles. The through-hole 22 and the stud 16 are dimensioned such that in the assembled state of the spectacles shown in FIG. 1, there is no play or there is little play, i.e. there is a transition fit or a clearance fit. A press fit can also be provided for; in that case, however, the pressing between the surface of the stud 16 and the surface of the through-hole 22 must not become so high that the spectacle lens 2 might run the risk of being fractured.

In the assembled spectacles, the contact portion 10 of the endpiece 8 rests against the front side 4 of the spectacle lens 2, and the stud 16 is arranged in the through-hole 22. As can be seen from FIG. 1, the free front surface of the stud 16, arranged below in FIG. 1, runs flush with the rear side 6 of the spectacle lens. A pin 24 is inserted into the through-hole 18 in the stud 16. In the shown embodiment, the pin 24 consists of an injection-moldable plastic material and comprises a straight, circular cylindrical shaft 26 as well as a head 28. The shaft 26 and the through-hole 18 are dimensioned such that there is a press fit between them so that the shaft 26 and, thereby, the pin 24 are fixed in the through-hole 18 by force-locking engagement. The head 28 of the pin 24 has a lenticular upper side and a diameter such that its lower side extends, at least partially, radially beyond the stud 16 and rests against the rear side 6 of the spectacle lens 2. The pin end facing away from the head 28 of the pin 24 has a surface which runs flush with the surface of the contact portion 10 facing away from the spectacle lens 2, as is shown in FIG. 1.

In the way described above, the endpiece 8 is firmly and reliably connected with the spectacle lens 2. Due to the engagement between the stud 16 with the non-circular cross-sectional profile and the through-hole 22 with the likewise non-circular cross-sectional profile of the same shape, the spectacle lens 2 and the endpiece 8 cannot be rotated relative to each other about the axis of the stud 16, so that in this way there exists a rotation-preventing means for preventing the rotation by a form-locking engagement. The spectacle lens 2 is clamped between the contact portion 10 and the head 28 of the pin 24 so that the endpiece 8 and the spectacle lens 2 are reliably fixed relative to each other also in the direction of the axis of the stud 16.

In the following, it will be explained how the endpiece 8 is mounted to the spectacle lens 2 so that the endpiece 8 and the spectacle lens 2 are connected with each other in the manner shown in FIG. 1.

First, the through-hole 22 having the previously described non-circular cross-sectional profile is formed in the spectacle lens 2. This can, for example, be effected by forming two bores in the spectacle lens by means of a drill in such a manner that the second bore partly overlaps the first bore.

The endpiece 8 is manufactured with the shape shown in FIG. 2. As can be seen from FIG. 2, the stud 16 is overlong, i.e. it has a length which is larger than the length of the stud in the assembled state of the spectacles. From the front side 4 of the spectacle lens 2, the stud 16 is then inserted into the through-hole 22 in the spectacle lens, and the contact portion 10 is pushed or pressed until it rests against the front side 4 of the spectacle lens 2. Due to the initial excessive length of the stud 16, the latter thereafter projects from the rear side 6 of the spectacle lens 2. This projection is removed in a suitable manner, i.e. the stud 16 is shortened such that its free front surface runs flush with the rear side 6 of the spectacle lens 2. The arrangement of endpiece 8 and spectacle lens 2 resulting therefrom is shown in FIG. 4.

So as to form the pin 24, first a pin blank 30 is manufactured, as is shown in FIG. 4. The pin blank 30 has the head 28 and the shaft 26 of the pin 24; however, the shaft 26 has an excessive length, i.e. it is longer than the shaft 26 of the pin 24 in the assembled state of the spectacles. As can be seen from FIG. 4, a shaft portion 32 extends from the shaft 26, the shaft portion 32 having a smaller diameter than the shaft 26 and a smaller diameter than the through-hole 18 in the stud 16. The transition between the shaft 26 and the shaft portion 32 is formed in a conically tapering manner. The shaft portion 32 is followed by a conically tapering end 34.

After the stud 16 has been inserted into the through-hole 22 and has been shortened, as described before, the pin blank 30 is inserted from below in FIG. 4 into the through-hole 18, as is shown in FIG. 4. This mounting step is facilitated in that the shaft portion 32 has a smaller diameter than the through-hole 18. Subsequent to the state shown in FIG. 4, the pin blank 30 is completely pushed or pulled into the through-hole 18 until the state shown in FIG. 5 is reached. When this is done, the shaft portion 32 can be used for pulling the pin blank 30 into the through-hole 18; to this effect, the shaft portion 32 is gripped by means of a tool and the pin blank 30 is pulled at by means of the tool.

Due to the fact that the pin 24, and, thus, also the pin blank 30, is made of a suitably selected plastic material, the pin 24 is deformable to a certain extent. When the pin blank 30 is pulled or pressed into the position shown in FIG. 5, this deformability leads to and is made use of for inclining or tilting the head 28 with respect to the axis of the pin blank 30 to such an extent that the lower side of the head 28 does not only abut on the rear side 6 of the spectacle lens 2 at points but substantially over the entire circumference of the head 28.

Subsequent to the mounting state shown in FIG. 5, the pin blank 30 is shortened such that the free end of the shaft 26 runs flush with the surface of the contact portion 10 facing away from the spectacle lens 2, as is shown in FIG. 1. Thus, the mounting of the endpiece 8 to the spectacle lens 2 and the method for connecting the endpiece 8 with the spectacle lens 2, respectively, are completed.

The embodiment of the rimless spectacles according to the invention, as described above, furthermore comprises a right spectacle lens as well as a second, right endpiece, both of which are not shown. The second endpiece is connected to the second spectacle lens in the same way as this has been explained in the foregoing in respect of the first, left endpiece, and the left spectacle lens 2.

Furthermore, the embodiment described above of the spectacles according to the invention comprises a bridge which is not shown and which is also connected with the two spectacle lenses in basically the same way as described above in respect of the connection between the left spectacle lens and the left endpiece.

Deviating from the embodiment described above, it is possible to form not all the connections between the bridge, the endpieces and the spectacle lenses in the manner described above, but, for example, merely the connections between the endpieces and the spectacle lenses or between the bridge and the spectacle lenses.

In the embodiment described above, the contact portion is arranged on the front side of the spectacle lens and the head of the pin is arranged on the rear side of the spectacle lens. Deviating from this arrangement, it is possible to arrange the contact portion on the rear side of the spectacle lens and the head of the pin on the front side thereof.

In the embodiment described above, the shaft of the pin is fixed in the through-hole in the stud by force-locking engagement. Deviating therefrom, this fixation can be effected by a form-locking engagement, for example, by providing the shaft with an external thread or other snap-in projections.

In the embodiment described above, the pin consists of a plastic material. Deviating from this, the pin may consist of a metallic material, provided its ductility is sufficient to allow the desired deformation of the head of the pin until it abuts on the front or rear side of the spectacle lens.

In the embodiment described above, the stud has been shortened after having been inserted into the first through-hole. Deviating from this, the stud can be shortened before it is inserted into the first through-hole. As it should normally not be possible to shorten the stud to the exact length such that its free front surface, after the stud has been inserted into the first through-hole, runs flush with the side of the spectacle lens facing away from the contact portion, the free front surface is in this case arranged inside the first through-hole. Furthermore, the endpiece can, right from the beginning, be made such that the stud is not overlong but has a length such that it ends inside the first through-hole in the spectacle lenses concerned.

Furthermore, it is also possible to modify the above embodiment of the inventive rimless spectacles within the scope defined by the claims.

Rimless spectacles, comprising two spectacle lenses, a bridge and two endpieces, have a first through-hole for connecting the bridge and/or the two endpieces with the respective spectacle lens, the first through-hole being formed in the latter and extending from the front side to the rear side thereof. The bridge and/or the endpiece has an contact portion abutting on the front side or on the rear side of the spectacle lens as well as a stud formed in one piece with the contact portion and inserted into the first through-hole. The first through-hole and the stud have corresponding non-circular cross-sectional profiles. In the stud and in the contact portion, a second through-hole is formed, with a pin being inserted therein, the pin having a head which, with its lower side, abuts on the spectacle lens on the side thereof facing away from the contact portion.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Rimless spectacles comprising two spectacle lenses, a bridge connected with both spectacle lenses, a first endpiece (8) connected with the one of the spectacle lenses (2) at a portion thereof facing away from the bridge, and a second endpiece connected with the other one of the spectacle lenses at a portion thereof facing away from the bridge, wherein, for connecting the bridge and/or the two endpieces with the respective spectacle lens (2), the latter has a first through-hole extending from the front side (4) to the rear side (6) thereof, and the bridge and/or each of the two endpieces has/have a contact portion (10) abutting on the front side or the rear side of the spectacle lens as well as a stud (16) integrally formed with the contact portion and being inserted into the first through-hole, characterized in that the first through-hole (22) has a non-circular cross-sectional profile, that the stud (16) has a non-circular cross-sectional profile conforming to the cross-sectional profile of the first through-hole, that in the stud and in the contact portion, a second through-hole (18) is formed, and that a pin (24) is inserted into the second through-hole, said pin having a head (28) which, with its lower side, abuts on the spectacle lens (2) on the side thereof facing away from the contact portion (10).

2. Spectacles according to claim 1, characterized in that the contact portion (10) and the stud (16) comprise plastic material.

3. Spectacles according to claim 1, characterized in that each of the conforming non-circular cross-sectional profiles of the first through-hole (22) and the stud (16) is a profile defined by two partly overlapping circles.

4. Spectacles according to claim 1, characterized in that each of the conforming non-circular cross-sectional profiles of the first through-hole and the stud is a flat oval profile having straight long sides.

5. Spectacles according to claim 1, characterized in that a transition fit is provided between the first through-hole (22) and the stud (16).

6. Spectacles according to claim 1, characterized in that a clearance fit is provided between the first through-hole (22) and the stud (16).

7. Spectacles according to claim 1, characterized in that the free front surface of the stud (16) runs flush with the side of the spectacle lens (2) facing away from the contact portion (10).

8. Spectacles according to claim 1, characterized in that the pin is fixed in the second through-hole by a form-locking engagement.

9. Spectacles according to claim 8, characterized in that the pin has an external thread.

10. Spectacles according to claim 1, characterized in that the pin (24) is fixed in the second through-hole (18) by a force-locking engagement.

11. Spectacles according to claim 1, characterized in that the pin (24) consists of plastic material.

12. Spectacles according to claim 1, characterized in that the upper side of the head (28) of the pin (24) is lenticular.

13. Spectacles according to claim 1, characterized in that the pin end facing away from the head (28) of the pin (24) runs flush with the surface of the contact portion (10) facing away from the spectacle lens (2).

14. Spectacles according to claim 1, characterized in that the contact portion (10) is arranged on the front side (4) of the spectacle lens (2).

* * * * *